UNITED STATES PATENT OFFICE.

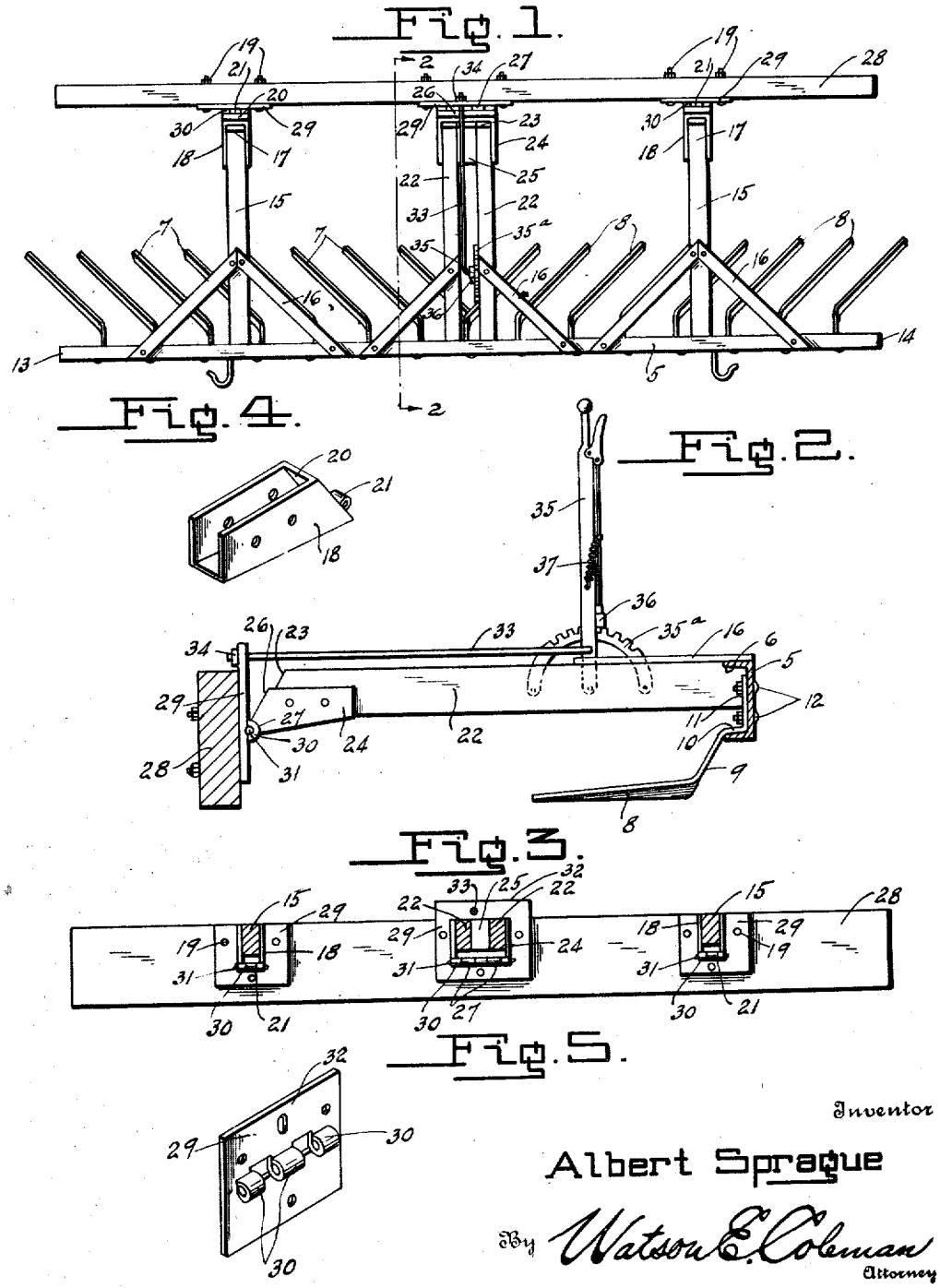

ALBERT SPRAGUE, OF LONGMONT, COLORADO.

GROUND-TREATING IMPLEMENT.

1,424,857. Specification of Letters Patent. Patented Aug. 8, 1922.

Application filed December 3, 1921. Serial No. 519,615.

*To all whom it may concern:*

Be it known that I, ALBERT SPRAGUE, a citizen of the United States, residing at Longmont, in the county of Boulder and State of Colorado, have invented certain new and useful Improvements in Ground-Treating Implements, of which the following is a specification, reference being had to the accompanying drawings.

This invention relates to ground treating implements and has for its object to provide an instrument adapted for weeding, scraping and leveling the ground.

It is another object of the invention to provide an implement of this character including a supporting beam having a plurality of ground engaging blades carried thereby and a scraping implement pivoted to beams projecting from the supporting beam, said scraping implement being provided with means whereby the same may be adjusted to increase or decrease the amount of dirt gathered thereby.

It is also an object of the invention to provide an implement of this character wherein the scraping or leveling member is pivoted to a support, the support being provided with a lever which is operatively connected to the scraper whereby the scraper may be substantially swung above the ground to permit passage of the dirt that has been collected by the scraper to pass between the same.

It is also an object of the invention to provide an implement of this character including a forward beam provided with a plurality of ground engaging blades and a rear support or scraping member, said member being also adapted to be adjustable to not only increase or decrease the scraping action thereof, but to adjust the distance of penetration of the blades with respect to the ground.

It is still a further object of the invention to provide an implement of this character including a forward beam and a plurality of rearwardly extending connecting beams, a scraper beam or implement being pivoted to the ends of the connecting beams at its intermediate portion, the upper portion of the scraper beam having a rod connected thereto, the rod being connected at its opposite end to an adjusting lever carried by the center connecting beam.

With these and other objects in view, the invention consists in the improved construction and arrangement of parts to be hereinafter more particularly described, fully claimed and illustrated in the accompanying drawings, in which:—

Figure 1 is a top plan view of a ground treating implement constructed in accordance with an embodiment of the invention;

Figure 2 is a section taken on the line 2—2 of Figure 1;

Figure 3 is a longitudinal sectional view showing the hinged connection of the scraping implement;

Figure 4 is a perspective view of one of the shoes carried by the connecting beam of the implement; and Figure 5 is a perspective view of the intermediate plate carried by the scraping implement.

Referring to the drawings, 5 designates the main supporting beam, said beam being constructed of any material desired, preferably channel iron, the channel 6 of the beam being disposed inwardly of the implement. In connection with the beam, ground treating blades 7 and 8 are used, each of the blades including a shank 9, the intermediate portion 10 of said shank being offset and adapted to engage the lower flange of the channel iron, while the extremity 11 of the shank is disposed in engagement with the inner face of the channel 6. Fastening means such as bolts 12 are used to connect the extremity 11 to the beam. By this means, the intermediate portion of the shank is firmly disposed in engagement with the supporting beam to rigidly brace the plate. The plate is also inclined with respect to the shank 9, that is, the rear edge of the plate is inclined upwardly so that the forward edge extends toward the ground. This feature also permits any dirt that may be gathered by the plate to be rigidly discharged so that a self-cleaning blade is thereby provided. The blades may be of any length desired, the blade 7 inclining outwardly from the intermediate portion of the beam 5 to the end portion 13 thereof, while the beam 8 inclines outwardly from the intermediate portion of the beam 5 to the end portion 14 thereof. In this way side movement to a large extent is prevented and all portions of the ground over which the implement passes are properly treated.

Projecting from the inner face of the beam 5 and having one of their ends disposed within the channel of the beam, are end connecting beams 15, said beams being disposed inwardly of the ends of the main beam 5 and projecting a considerable distance beyond and in right angular relation to the beam 5. Braces 16 are connected to the main beam 5 and to each of the beams 15 to prevent relative movement of the main beam and the beams 15. The end portions 17 of each of the beams 15 are beveled downwardly toward the ground and are adapted to receive a shoe 18, said shoe being bolted as at 19 to the beams. The end wall 20 of the shoe is inclined to correspond to the tapered end of the beam and has a knuckle 21 projecting from its lower extremity.

Disposed between the end beams 15 and projecting from the intermediate portion of the main beam 5 is a pair of intermediate connecting beams 22, the ends 23 of the beams 22 being beveled similar to the beams 15 and adapted to receive a shoe 24. A spacing member 25 is disposed between the beams 22 and within the shoe 24 to substantially provide a slot between said beams. The end wall 26 of the shoe 24 is beveled to correspond to the beveled portion of the beams 22 and has a plurality of knuckles 27 projecting from its extremity.

In connection with the connecting beams and the main beam 5 a scraping element or beam 28 is used. Said beam may be made of any desired material, preferably wood. Secured to the intermediate and end portions of the beam or scraping member 28, by means of bolts, are plates 29, each plate having knuckles 30 projecting from its intermediate portion and adapted to register with the knuckles of the adjacent shoe, a pintle 31 being passed through the registering knuckles whereby the scraping member is pivotally connected to the connecting beams. The plates 29 not only serve to pivotally connect the scraping member to the connecting beams, but also to reinforce said scraping member as they extend transversely of said scraping member. The intermediate plate 29 has its upper end 32 projecting above the edge of the scraping member and provided with an opening adapted to receive one end of an adjusting rod 33, a nut 34 being threaded on the rod to connect the rod to the intermediate blade. Disposed within the slot formed within the beams 22 and adjacent the forward end of said beams, is an adjusting lever 35, said lever being pivoted within the slot below the upper edge of the beams. The opposite end of the rod 33 is pivotally connected to the lever 34 so that movement of the lever 34 will cause corresponding movement of the scraping member or beam 28. A quadrant 35ª is secured to the beams 22 within the slot and is provided with teeth for the reception of a manually operable pawl 36, a spring 37 being provided for urging the pawl into engagement with the teeth of the quadrant whereby the scraping member 28 may be held in various adjusted positions.

In the operation of the device, the beam 28 when disposed substantially vertically with respect to the beam 5, serves as a rear support for the implement, and controls to a large extent the penetration of the blades into the surface of the ground. If it is desired that the blades be extended further into the surface of the ground, the lever 34 may be adjusted so as to incline the member 28, thereby increasing the pressure upon the blades and causing the same to penetrate the ground. At the same time, the beam 28 also performs its function of scraping and leveling the ground over which the implement is traveling. By the novel formation of the shoes 20 and the beveled ends of the shoes and the connecting beams, it is possible to pivotally connect the scraping implement at its intermediate portion which greatly strengthens the scraping member and also facilitates the adjustment of said member as it is possible to directly connect the rod 33 to the upper portion of the scraping member through the medium of the intermediate blade 29 so that any movement of the lever 35 will cause corresponding movement of the scraping member. The beveled end portions of the connecting beams and the shoe also performs another function, namely, that of preventing damage to the connecting rod and the hinged connection of the scraping member to the beams, by serving as stops to limit movement of the scraping member away from the beams upon contact of the upper portion of the scraping member with said beveled end portions of the shoes and connecting beams. In addition to this, the slot provided between the intermediate beams permits, if necessary, the rod 33 to extend into the slot should the lever be swung a considerable distance forwardly or rearwardly in the adjustment of the scraping member.

From the foregoing it will be readily seen that this invention provides a novel ground treating implement wherein the scraping implement performs two functions, namely, that as a part of the frame of the implement, as well as the scraping and leveling means, and as there is no obstruction between the rear end of the connecting beams and the ground, adjustment of the scraping member will likewise control the ground penetrating movement of the blades 7 and 8. All of these features are possessed by a device that is simple in construction and compact in form and which in view of its substantial arrangement will last indefinitely.

What is claimed is:—

A ground treating implement of the character described comprising a main beam, blades carried by the rear ends of said beam, for supporting said beam above the ground, spaced connecting beams projecting from said rear face of the main beam, the rear ends of said beams being beveled and provided with connecting hinged sections, the end face of said connection being beveled, corresponding to the beveled ends of the connecting beams, and a scraping member having a plurality of blades secured to the forward face thereof, the intermediate portion of each face having hinged knuckles adapted to register with the knuckles of the connecting hinged section of the beams, and adjusting means carried by certain of said beams and operatively connected to the upper portion of the scraping member for moving said scraping member relative to the ends of the beams, said beveled ends of the connecting beams serving as stops to limit adjusting movement of the scraper in one direction.

In testimony whereof I hereunto affix my signature.

ALBERT SPRAGUE.